April 9, 1935.   O. E. KELLUM   1,997,300
SYNCHRONIZED TALKING PICTURE SYSTEM
Filed Aug. 22, 1933   3 Sheets-Sheet 1
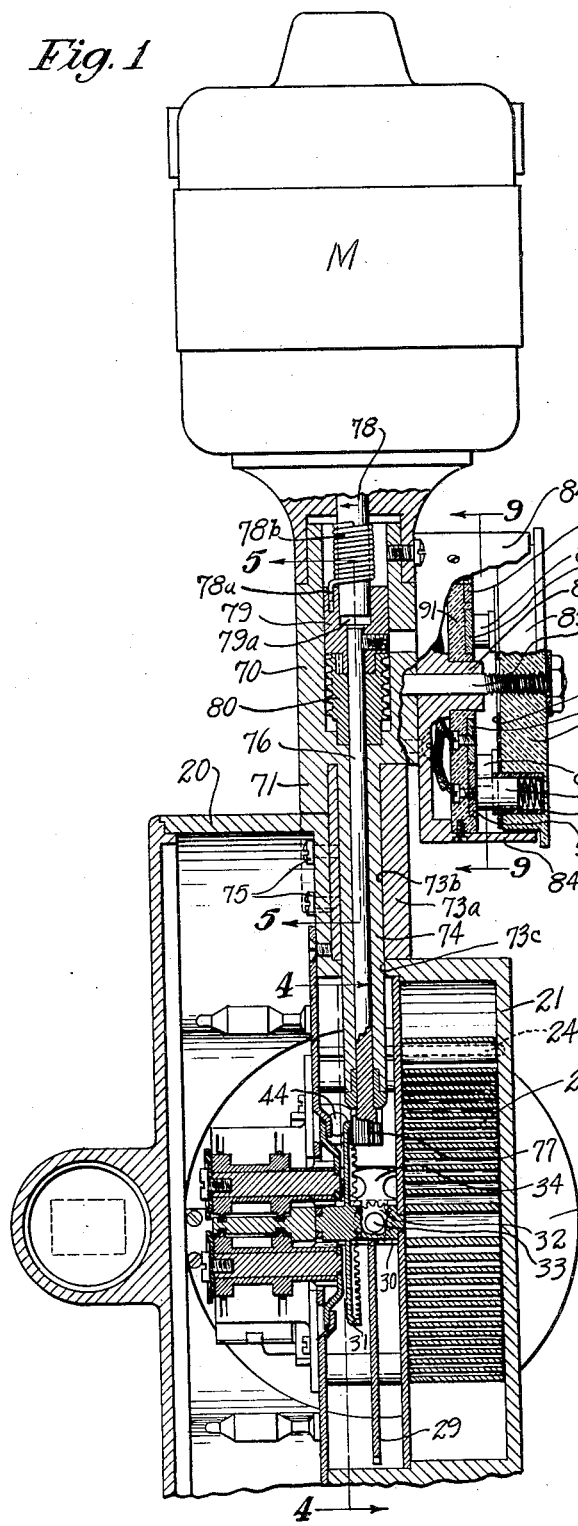
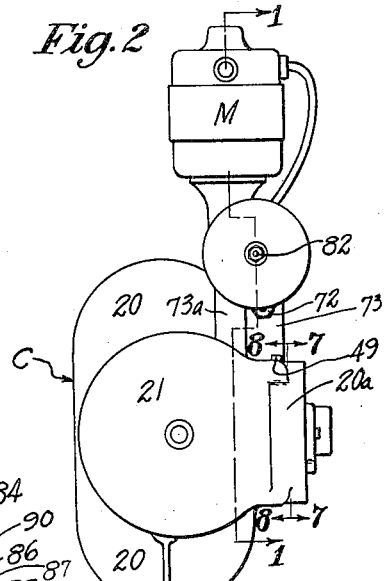
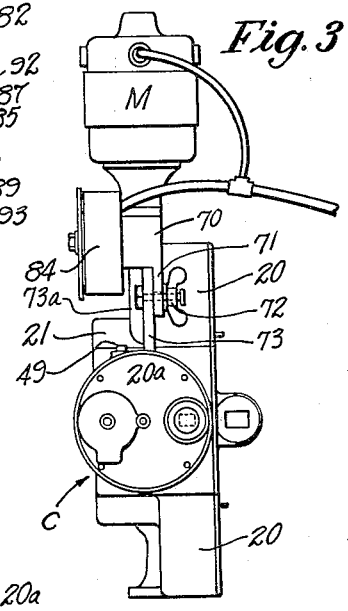
Inventor
Orlando E. Kellum.
Attorney.

April 9, 1935. O. E. KELLUM 1,997,300
SYNCHRONIZED TALKING PICTURE SYSTEM
Filed Aug. 22, 1933   3 Sheets-Sheet 2

Inventor
Orlando E. Kellum.

Attorney.

April 9, 1935.   O. E. KELLUM   1,997,300
SYNCHRONIZED TALKING PICTURE SYSTEM
Filed Aug. 22, 1933   3 Sheets-Sheet 3
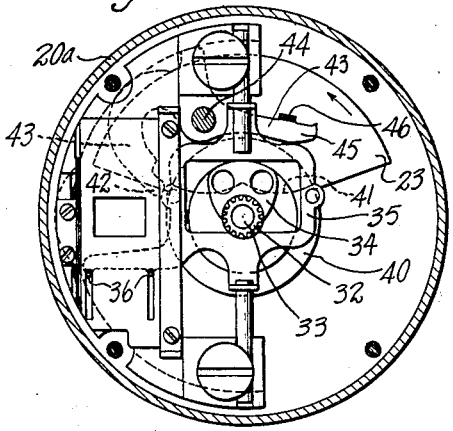
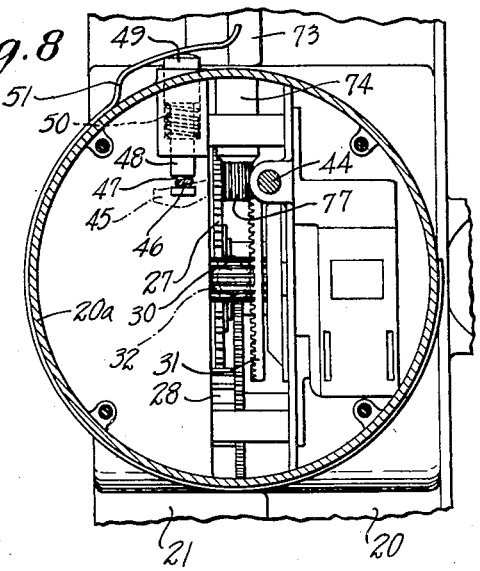
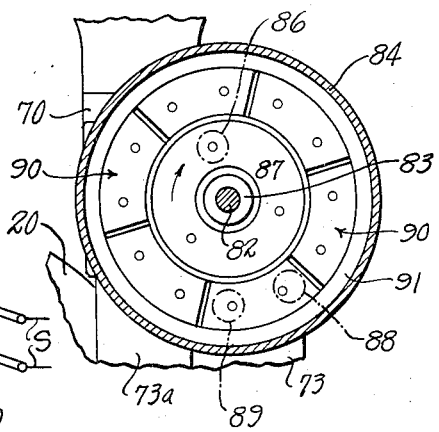
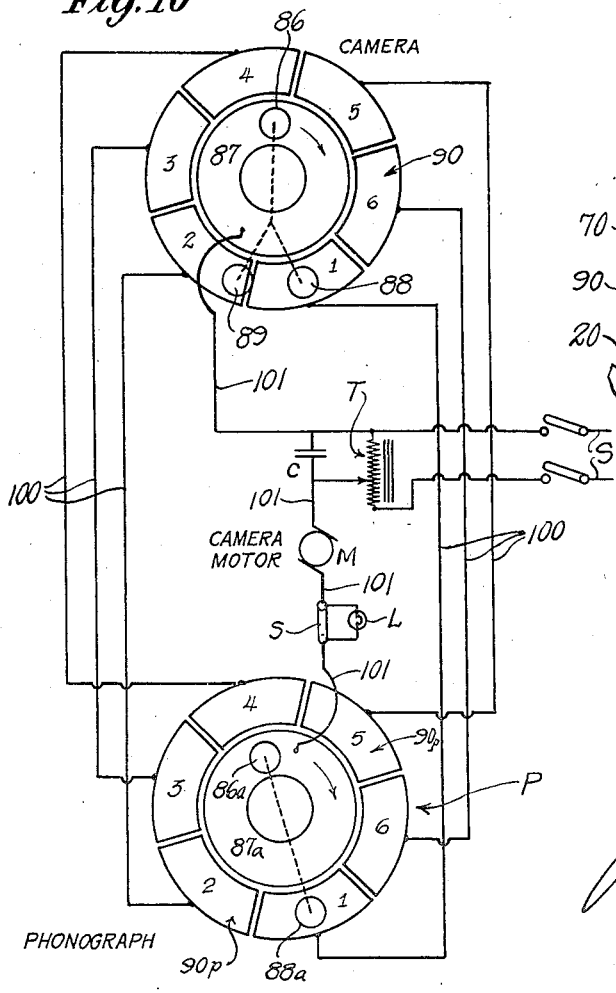
Inventor
Orlando E. Kellum.
Attorney.

Patented Apr. 9, 1935

1,997,300

UNITED STATES PATENT OFFICE 1,997,300

SYNCHRONIZED TALKING PICTURE SYSTEM

Orlando E. Kellum, Moreno, Calif., assignor, by mesne assignments, to Syncro Sound, Inc., Los Angeles, Calif., a corporation of California Application August 22, 1933, Serial No. 686,218

14 Claims. (Cl. 88—16.2)

This invention has to do with synchronization of sound pictures, and particularly with the application of synchronizing means to cameras and projectors, and has as one of its particular objects the provision of a unitary synchronizing controlling device in the form of an attachment which may be readily applied to a kinetograph mechanism. It is also a broad object to provide an improved synchronizing system which includes the unitary attachment as an element.

Without the necessity of first describing briefly and generally the devices and mechanisms which constitute the invention, the invention itself will be best understood from a detailed and specific consideration of the typical form of the devices and mechanisms. For the purpose of describing such typical forms I have shown them applied to a specific and typical form of camera mechanism, by way of illustration; but it will be readily understood from consideration of such typical and illustrative matter how the invention may be applied to other specific forms of kinematograph mechanisms.

For the purpose of the following description, I have illustrated typical forms of the synchronizing system and devices applied to an illustrative camera, in the accompanying drawings in which Fig. 1 is a sectional view taken as indicated by line 1—1 of Fig. 2;

Fig. 2 is a reduced side elevation, the aspect of which is from the right of Fig. 1;

Fig. 3 is a front elevation, the aspect of which is reversed to that of Fig. 1;

Fig. 7 is an enlarged section on line 7—7 of Fig. 2;

Fig. 8 is an enlarged section on line 8—8 of Fig. 2;

Figs. 7 and 8 being sections taken on the same sectional plane but in opposite aspects.

Fig. 9 is a section on line 9—9 of Fig. 1; and

Fig. 10 is a diagram illustrating the electrical circuiting of the system.

Figure 4:
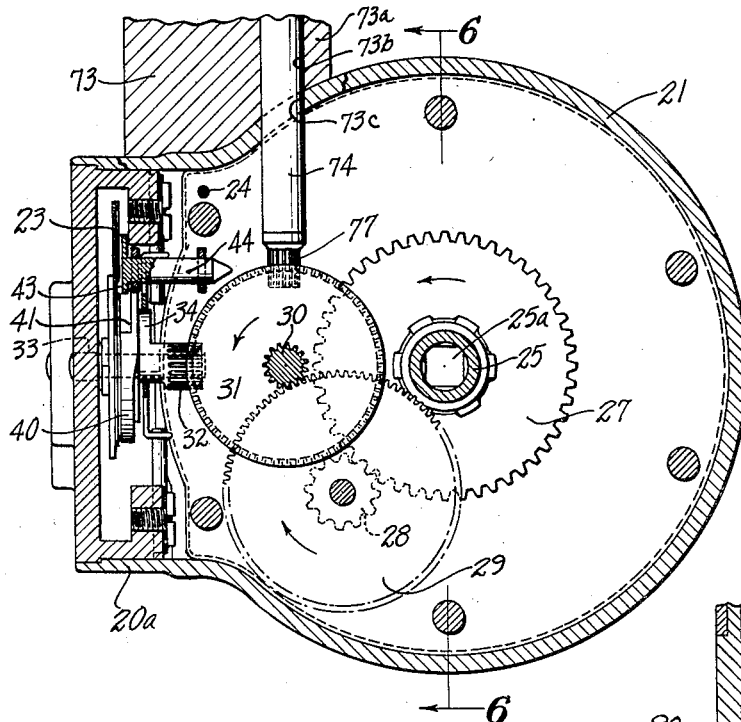
Fig. 4 is an enlarged section taken as indicated by line 4—4 on Fig. 1.
Figure 5:
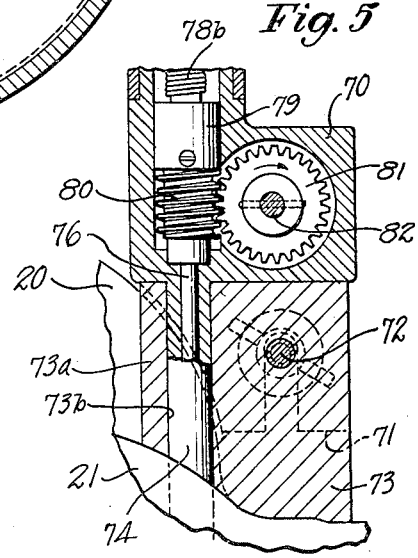
Fig. 5 is an enlarged detailed section taken as indicated by line 5—5 on Fig. 1.
Figure 6:
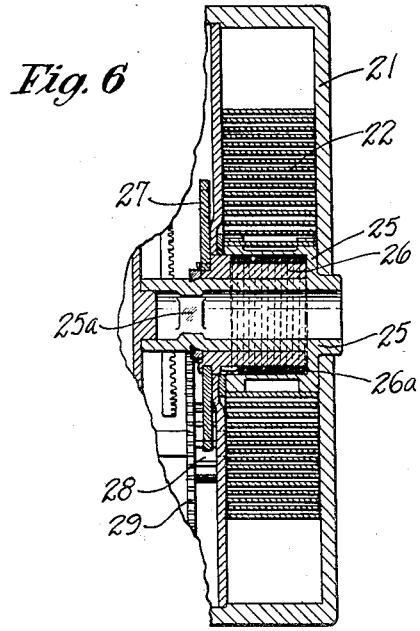
Fig. 6 is a section taken as indicated by line 6—6 on Fig. 4.

In Figs. 2 and 3 the camera is indicated generally by the letter C, and the numeral 20 designates that part of the camera casing which encloses the movement mechanism and the film rolls, the numeral 21 designates that part of the casing that encloses the normal driving spring 22 and the train of gears through which the driving spring is connected to the movement mechanism, and the numeral 20a designates that circular part of the casing which, projecting forwardly from casing 20, encloses parts of the camera movement and also the shutter 23 which is shown in Fig. 7. In the illustrative camera here illustrated the driving spring 22 is affixed at its outer end to the casing by an anchoring pin 24 (see Fig. 1); and the inner end of the spring is secured to a rotatable sleeve 25 (see Figs. 4 and 6). This sleeve 25 has in its outer end a squared wrench opening 25a for spring winding, and the sleeve is drivingly connected with another sleeve 26 through the medium of a ratchet or one-way slip clutch which in this case is formed of a coiled spring 26a. The ratchet allows the spring to be wound without rotating sleeve 26 reversely. Sleeve 26 carries gear 27 which meshes with pinion 28, which in turn carries gear 29 that meshes with pinion 30. These gears and pinions are shown best in Fig. 4, and pinion 30 also appears in Fig. 1. The pinion 30 carries a ring gear 31, and that ring gear meshes with pinion 32 mounted on shutter shaft 33. Also mounted on this same shutter shaft 33 are a cam plate 40 and a movement cam 34 that drives the box-shaped cam follower 35 which carries the film moving claws 36 (see Fig. 7). It is unnecessary here to explain further in detail the exact features of the movement mechanism, except insofar as relates, in this particular illustrative camera, to the releasable stop which normally holds the whole mechanism at rest.

Cam plate 40 has in it a notch 41 of the shape indicated in Fig. 7; and the end 42 of a finger 43 is adapted normally to project into the notch and, by the end wall of the notch coming into engagement with it, to stop rotation of the shutter shaft. Finger 43 is pivoted at 44 and has an end 45 carrying a lug 46. Lug 46 engages in a groove 47 in the shank 48 of finger button 49 (see Figs. 7 and 8 for these parts), which button is normally held up by spring 50; and thus finger 43 is normally held in position where it will engage the wall of notch 41 to stop the mechanism, and the stop may be released by depressing the button. Figs. 7 and 8 show the parts in release position; and Fig. 8 also shows a spring clip 51 that encircles circular housing 20a and that may be shifted around the housing to engage the button to hold it depressed. I provide such a clip for convenience in holding the stop released while the mechanism is being operated under control of the synchronous system.

The foregoing, except for my addition of the spring clip, describes a known camera that may be taken as typical of such kinetograph mechanisms to which my synchronizing system is applicable. The system, and particularly the control attachment, is now described.

Motor M is a series wound motor operating on alternating current and, in this particular case, designed to operate at a normal speed of 2160 R. P. M. Attached to the end of the usual motor housing or body I provide an extension casing 70 which has at its lower end an attaching flange 71 adapted to be secured, by the bolt and wing nut 72, to a flange 73 which is especially provided on the camera. This flange 73 has an enlarged part 73a with a bore 73b; and through this bore the shaft housing 74 projects inwardly into the interior of the camera. The flange plate 73 is secured to the kinetograph case by the screws shown at 75 in Fig. 1, and the camera casing is provided with an aperture 73c registering with bore 73b.

Shaft housing 74 is formed as an extension of the casing 70, and this housing carries a pinion shaft 76 on the end of which, and beyond the end of shaft housing 74, the pinion 77 is mounted to mesh with ring gear 31. Pinion 77 is smaller in diameter than shaft housing 74 so that the pinion, as well as the shaft housing, may be introduced to its proper operative position through the bore 73b.

The outer or motor end of pinion shaft 76 carries a collar 79 secured to it. The end of motor shaft 78 enters a bore 79a in the collar, and a coiled spring 78b more or less tightly frictionally encircles motor shaft 78 and has one end 78a secured to collar 79. Spring 78b acts as a ratchet or one-way slip clutch between the motor shaft and pinion shaft, being coiled in such direction that its tendency is to unwind or loosen on motor shaft 78 as the motor shaft is driven ahead of the pinion shaft 76, thus allowing the motor shaft to rotate in the direction indicated by the arrow shown thereon relative to pinion shaft 76 when the pinion shaft is held back, as in case the camera mechanism should jam. On the other hand, the pinion shaft cannot rotate in the same direction, which is the normal direction of rotation when the camera is operating, without the motor also being rotated, since in that case the tendency is for the spring to tighten and frictionally grip shaft 78. It is essential in this type or clutch that normally the coil spring grip the shaft comparatively tightly, that is, tightly enough frictionally that upon movement of the shafts relatively in such a direction as tends to wind the spring up, the spring will instantly grip or tighten about the shaft and give a positive drive. The direction of rotation in which the two shafts are locked together in that manner is that which takes place when the camera tends to run ahead of the motor, so that the camera cannot rotate ahead without the motor M also rotating. In the other relative direction of rotation, that is, motor M tending to rotate ahead of the camera, the spring is reversely twisted and tends to unwind and release its lock. That is the tendency when the control motor is driving the camera. To the extent of the friction involved in slipping of this spring clutch, the motor necessarily tends to drive the camera.

Also mounted on pinion shaft 76, and keyed to collar 79 so as always to rotate with the pinion shaft, is a worm 80 that meshes with worm wheel 81 mounted on commutator shaft 82. Commutator shaft 82 rotates in a bearing 83 in the stationary commutator housing 84; and the shaft carries on its outer end, to rotate with it, a brush carrying disc 85 of insulating material. On this disk are mounted and carried certain brushes, preferably three in number. Brush 86 is set in such a position as to wipe over the stationary collector ring 87, while the two brushes 88 and 89 are set in such position as to ride over the six stationary commutator segments 90. The collector ring and commutator segments are set in and carried by insulating disc 91 stationarily mounted on the hub of bearing 83. All three brushes 86, 88 and 89 are electrically interconnected by a conductive plate 92 with which the spring sockets 93 of the several brushes are in conductive engagement. The two segment contacting brushes 88 and 89 are set apart circumferentially a distance somewhat less than the circumferential length of a segment, but so that the leading brush, which is 89 in this case, will move into engagement with the next segment very soon after the following brush 88 has completely left off engagement with the second segment behind. This will be readily understood from a consideration of Figs. 9 and 10.

In the particular kinetograph mechanism here illustrated as typical, the speed of the movement is 1440 per min. or 24 per sec. The movement pinion 32 has 15 teeth. In this particular case I make the drive pinion 77 have 10 teeth; so that the normal speed of pinion shaft 76, and therefore of motor M, is 2160 R. P. M., to obtain the desired camera speed. I make the gear ratio at the worm train 80, 81, to be 1 to 27; so that the speed of the commutator is then 80 R. P. M., which is the normal speed for a phonograph table for reproducing or recording.

Assuming then that another commutator mechanism P, similar to the commutator mechanism before described, is mounted on a phonograph table shaft, or rotatively connected to it to rotate at even speed, the operation of the whole system will be understood from what follows. I have said that the described commutator has six segments. Any number of segments may be adopted, but I find six to be sufficient. The two commutators have equal numbers of segments 90 and 90p. If the segments are numbered from 1 to 6 in the order of rotation, as they are in Fig. 10, then the correspondingly numbered segments are interconnected by the circuit wires 100; these circuit wires in the actual apparatus being included in a cable which runs from the phonograph mechanism to the camera or projector mechanism. The brush system of each commutator makes a connection between the collector ring and one or more of the commutator segments. The phonograph commutator P preferably has only two interconnected brushes, 86a on the collector ring, and 88a on the segments. Between the two collector rings 87 and 87a there is connected a wire circuit which, as here preferably shown in the diagram, includes the kinetograph motor M and auto-transformer T which is fed from the source S, a condenser c bridging the transformer, an indicator light L controlled by a short-circuiting switch s, and the necessary interconnecting wires 101 to complete the circuit between the two collector rings. Auto-transformer T reduces the effective potential in the operating circuit without resistance losses and thus allows the whole system to be operated from ordinary house lighting current but at the same time to be operated at a potential which minimizes sparking difficulties.

Assuming that the two commutators are set in the relative position shown in Fig. 10 current will flow from one side of the auto-transformer through circuit 101 to collector ring 87, through the brushes 86, 88 and 89 to one or more of the segments 90, including the segment 1, from the segment 1, of the camera commutator, through the interconnecting wire 100 to the segment 1 of the phonograph commutator, and thence via the brushes 88a and 86a, collector ring 87a and circuit connection 101 to and through motor M to the other side of the transformer. In this state of affairs current will be supplied to the motor that will cause it to run ahead. If commutator P be stationary motor M will run ahead substantially just far enough to carry the following brush 88 of the camera commutator off of segment 1 and onto segment 2, when the motor circuit will be broken and the motor stopped. If, however, the phonograph commutator is also in motion, brush 88a will arrive at its segment 2 at about the same time that the following brush 88 arrives at its segment 2; so that the motor circuit will be kept closed through those segments. And it will be readily understood how the motor circuit is thus kept closed continuously so long as the two commutators are rotating in proper synchronism and step by step relation. The motor M is chosen and designed to have power in excess of its load; which load may be very light, as will be explained; so that there is a constant tendency for the motor and its interconnected commutator constantly to run ahead of the phonograph commutator rather than to lag behind it. This excess motor power, and the constant tendency of the motor to run somewhat ahead of step by step relation to the phonograph is the factor of safety in the system that makes it highly improbable that the motor and the kinetograph controlled by it will ever get out of step with the phonograph by reason of lagging behind.

And the kinetograph motor, and the kinetograph, can never get out of step by running freely ahead, because, as the kinetograph commutator brushes each time leave the end of the segment to which current at that instant is being applied by phonograph commutator, power for the instant is cut off from the motor which causes it to fall temporarily in speed until the phonograph commutator catches up. Thus it is assured that the kinetograph motor and the kinetograph move at all times in very close step by step synchronism with the phonograph, although the average position of the brushes in the two commutators is not exactly the same with respect to their segments. The approximate registering position of the two commutators is that in which brush 88a is just about to leave a given segment, say segment 1, and the following brush 88 of the kinetograph commutator has just passed over that corresponding segment 1. Thus the two mechanisms may be initially set in corresponding and proper starting positions by rotating the phonograph and its commutator until current, as indicated by lamp L (switch s being open) flows through the synchronizing circuit. Motor M will thus immediately be energized to move the kinetograph commutator off that corresponding segment and stop. The synchronous setting position is thus indicated by momentary flash of lamp L, after which switch s may be closed. And the two mechanisms having thus been set in starting position, with the power circuit to the synchronizing system and the kinetograph motor closed except for the disalinement of the commutators, it is then only necessary, in order to start proper synchronous operation, to start the phonograph in its regular operation.

The reason for the double brushes 88 and 89 on the kinetograph commutator is merely to give a somewhat wider range of segment contact in that commutator so that the motor will continue to be fed with current even if, for some temporary reason, the two commutators should for any short period get slightly out of exact step relation.

I have stated that the action of spring clutch 78 is such that the kinetograph cannot run ahead of the motor. The mechanical set up is also such that the kinetograph cannot drive ahead. The motor, although small, has a considerable inertia; and the driving pinion 77 has such a small number of teeth as to make the drive from ring gear 31 to pinion 77 more or less self-locking; that is, pinion 77 can efficiently drive ring gear 31, but ring gear 31 cannot efficiently drive pinion 77. In this regard the gear train 31, 77 forms, to all practical purposes and intents, a non-reversible drive like that formed by non-reversible worm gear train.

Consequently, the camera cannot either run ahead of the motor or drive the motor ahead, but can only run ahead as it is allowed to run ahead by the controlling motor M. Motor M can only run ahead as it is fed with current step by step from the commutator system. And, although the motor may run ahead of the kinetograph by slipping the clutch at 78, it will be noted that the motor controlling commutator always remains in fixed rotative relation to the kinetograph because the slip clutch is between the motor and the commutator drive.

For all these reasons, and the ones given previously, the phonograph and kinetograph mechanisms are assured to be always operating normally in very close synchronism, and if for any reason the kinetograph stops or slows down and motor M runs ahead, the proper relationship between the kinetograph and its commutator is not disturbed. Also the kinetograph can only start into normal operation by starting the phonograph into normal operation. Thus, in starting the whole system, the kinetograph starting button or other corresponding release means may be released and permanently set in the release position, as by the spring clip 51; then the two mechanisms may be put in proper synchronized starting position, as previously explained, without any possibility of the kinetograph running away from the phonograph; and when all things are in readiness the whole system is then started simply and solely by starting the phonograph in the normal manner. It will be understood, of course, that the phonograph mechanism may be driven by any suitable power; whether that power comes from an electric driving motor, a spring motor, a timed driving shaft, or a synchronized electric driving system such as is commonly used in the motion picture industry, or even from hand operation, it is of no consequence insofar as concerns my invention.

I claim:

1. In a synchronizing system applicable to a kinetograph mechanism having a film movement, a driving motor and an operative driving interconnection between the motor and movement, the combination of a kinetograph controlling motor, means whereby said controlling motor is driven at a predetermined speed including an electric circuit and a pair of commutators one of which rotates with the kinetograph mechanism, and operative interconnection between the control motor and the kinetograph mechanism including an irreversible gear train allowing the control motor to tend to drive the kinetograph but preventing the kinetograph from driving the control motor, and said operative connection also including a friction slip clutch allowing the control motor to run ahead of the kinetograph.

2. In a synchronizing system applicable to a kinetograph mechanism having a film movement, a driving motor and an operative driving interconnection between the motor and movement, the combination of a kinetograph controlling motor, an operative interconnection between the control motor and the kinetograph mechanism including a transmission shaft, a one-way slip clutch driving the shaft from the control motor and allowing the control motor to run ahead of the kinetograph, and means whereby the controlling motor is driven at a predetermined speed including an electric circuit and a pair of commutators one of which is driven from said transmission shaft.

3. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing rotatively connected with the motor shaft, a pinion on the end of the pinion shaft beyond the end of the housing, said pinion adapted to mesh with one of the gears of the kinetograph gear train when the shaft housing is extended into the kinetograph casing through the aperture therein, means for releasably mounting the motor body extension on the kinetograph case, and a motor controlling commutator mounted on the motor body extension and driven from said pinion shaft.

4. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing, a slip clutch element connecting the motor shaft with the pinion shaft allowing the motor to run ahead of the pinion shaft but preventing the pinion shaft from running ahead of the motor shaft, a pinion on the end of the pinion shaft beyond the end of the housing, said pinion adapted to mesh with one of the gears of the kinetograph gear train when the shaft housing is extended into the kinetograph casing through the aperture therein, means for releasably mounting the motor body extension on the kinetograph case, and a motor controlling commutator mounted on the motor body extension and driven from said pinion shaft.

5. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing rotatively connected with the motor shaft, a pinion on the end of the pinion shaft beyond the end of the housing, said pinion adapted to mesh with one of the gears of the kinetograph gear train when the shaft housing is extended into the kinetograph casing through the aperture therein, said pinion having a small number of teeth so that it forms, with said gear, a non-reversible gear train through which power cannot be transmitted from the kinetograph mechanism to the motor to drive the latter, means for releasably mounting the motor body extension on the kinetograph case, and a motor controlling commutator mounted on the motor body extension and driven from said pinion shaft.

6. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing, a slip clutch element connecting the motor shaft with the pinion shaft allowing the motor to run ahead of the pinion shaft but preventing the pinion shaft from running ahead of the motor shaft, a pinion on the end of the pinion shaft beyond the end of the housing, said pinion adapted to mesh with one of the gears of the kinetograph gear train when the shaft housing is extended into the kinetograph casing through the aperture therein, said pinion having a small number of teeth so that it forms, with said gear, a non-reversible gear train through which power cannot be transmitted from the kinetograph mechanism to the motor to drive the latter, means for releasably mounting the motor body extension on the kinetograph case, and a motor controlling commutator mounted on the motor body extension and driven from said pinion shaft.

7. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing rotatively connected with the motor shaft, a pinion on the end of the pinion shaft beyond the end of the housing, said pinion adapted to mesh with one of the gears of the kinetograph gear train when the shaft housing is extended into the kinetograph casing through the aperture therein, means for releasably mounting the motor body extension on the kinetograph case, a worm mounted on the pinion shaft in the hollow motor body extension, a cooperating worm wheel also in said extension, a commutator shaft on which the worm wheel is mounted, and a motor controlling commutator including a relatively stationary part mounted on the motor body extension and a relatively rotating part mounted on the commutator shaft.

8. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing, a slip clutch element connecting the motor shaft with the pinion shaft allowing the motor to run ahead of the pinion shaft but preventing the pinion shaft from running ahead of the motor shaft, a pinion on the end of the pinion shaft beyond the end of the housing, said pinion adapted to mesh with one of the gears of the kinetograph gear train when the shaft housing is extended into the kinetograph casing through the aperture therein, means for releasably mounting the motor body extension on the kinetograph case, a worm mounted on the pinion shaft in the hollow motor body extension, a cooperating worm wheel also in said extension, a commutator shaft on which the worm wheel is mounted, and a motor controlling commutator including a relatively stationary part mounted on the motor body extension and a relatively rotating part mounted on the commutator shaft.

9. In a kinetograph control system applicable to a kinetograph having an apertured case, a movement, a driving motor and a gear train operatively connecting the motor and movement, a unitary control motor assembly adapted to be applied to the kinetograph including an electric motor, an axial hollow extension of the motor body, said extension including a projecting shaft housing, a pinion shaft in said housing rotatively connected with the motor shaft, a pinion on the end of the pinion shaft beyond the end of the housing, said pinion adapted to mesh with one of the gears of the kinetograph gear train when the shaft housing is extended into the kinetograph casing through the aperture therein, said pinion having a small number of teeth so that it forms, with said gear, a non-reversible gear train through which power cannot be transmitted from the kinetograph mechanism to the motor to drive the latter, means for releasably mounting the motor body extension on the kinetograph case, a worm mounted on the pinion shaft in the hollow motor body extension, a cooperating worm wheel also in said extension, a commutator shaft on which the worm wheel is mounted, and a motor controlling commutator including a relatively stationary part mounted on the motor body extension and a relatively rotating part mounted on the commutator shaft.

10. In a kinetograph control system applicable to a kinetograph having an apertured case, a movement, a driving motor and a gear train operatively connecting the motor and movement, a unitary control motor assembly adapted to be applied to the kinetograph and including an electric motor, an axial hollow extension of the motor body, said extension including a projecting shaft housing, a pinion shaft in said housing, a slip clutch element connecting the motor shaft with the pinion shaft allowing the motor to run ahead of the pinion shaft but preventing the pinion shaft from running ahead of the motor shaft, a pinion on the end of the pinion shaft beyond the end of the housing, said pinion adapted to mesh with one of the gears of the kinetograph gear train when the shaft housing is extended into the kinetograph casing through the aperture therein, said pinion having a small number of teeth so that it forms, with said gear, a non-reversible gear train through which the power cannot be transmitted from the kinetograph mechanism to the motor to drive the latter, means for releasably mounting the motor body extension on the kinetograph case, a worm mounted on the pinion shaft in the hollow motor body extension, a cooperating worm wheel also in said extension, a commutator shaft on which the worm wheel is mounted, and a motor controlling commutator including a relatively stationary part mounted on the motor body extension and a relatively rotating part mounted on the commutator shaft.

11. In a kinetograph control system applicable to a kinetograph having an apertured case, a movement, a driving motor and a gear train operatively connecting the motor and movement, a unitary control motor assembly adapted to be applied to the kinetograph and including an electric motor, said assembly unit including a case, a pinion shaft in said assembly unit drivingly connected with control motor, said shaft projecting outside the case of the assembly unit, a pinion on the projecting end of the pinion shaft, said pinion adapted to mesh with one of the gears of the kinetograph gear train when the pinion shaft is extended into the kinetograph case through the aperture therein, means for releasably mounting the assembly unit on the kinetograph case, and a motor controlling commutator mounted on the assembly unit and drivingly interconnected with said pinion shaft.

12. In a kinetograph control system applicable to a kinetograph having an aperture case, a movement, a driving motor and a gear train operatively connecting the motor and movement, a unitary control motor assembly adapted to be applied to the kinetograph and including an electric motor, said assembly unit including a case, a pinion shaft in said assembly unit drivingly connected with the control motor, said shaft projecting outside the case of the assembly unit, a pinion on the projecting end of the pinion shaft, said pinion adapted to mesh with one of the gears of the kinetograph gear train when the pinion shaft is extended into the kinetograph case through the aperture therein, said pinion having a small number of teeth so that it forms, with said gear, a non-reversible gear train through which power cannot be transmitted from the kinetograph mechanism to the motor, means for releasably mounting the assembly unit on the kinetograph case, and a motor controlling commutator mounted on the assembly unit and drivingly interconnected with said pinion shaft.

13. In a synchronizing system applicable to a kinetograph mechanism having a case, the combination of a control motor assembly unit, means for releasably mounting said unit on the case of the kinetograph mechanism, an electric control motor in said assembly unit, motion transmitting means on said assembly unit adapted to engage the kinetograph mechanism to drivingly interconnect it with said electric motor when the assembly unit is attached to the case of the kinetograph mechanism, said motion transmitting means being so designed as to form with the kinetograph mechanism an irreversible driving interconnection allowing the control motor to drive the kinetograph but preventing the kinetograph from moving ahead of the control motor, and means for controlling the speed of said motor including a rotatable commutator mechanism mounted on and carried by the assembly unit and drivingly connected with said motion transmitting means so as to rotate in consonance with the kinetograph mechanism.

14. In a synchronizing system applicable to a kinetograph mechanism having a case, the combination of a control motor assembly unit, means for releasably mounting said unit on the case of the kinetograph mechanism, an electric control motor in said assembly unit, motion transmitting means on said assembly unit adapted to engage the kinetograph mechanism to drivingly interconnect it with said electric motor when the assembly unit is attached to the case of the kinetograph mechanism, said motion transmitting means being so designed as to form with the kinetograph mechanism an irreversible driving interconnection allowing the control motor to drive the kinetograph but preventing the kinetograph from moving ahead of the control motor, means for controlling the speed of said motor including a rotatable commutator mechanism mounted on and carried by the assembly unit and drivingly connected with said motion transmitting means so as to rotate in consonance with the kinetograph mechanism, and a slip clutch element in the motion transmitting means located between the point of connection of the rotatable commutator mechanism and the control motor, said slip clutch element allowing the control motor to run ahead of the kinetograph mechanism when the kinetograph mechanism is held back.

ORLANDO E. KELLUM.